United States Patent
Classen et al.

(10) Patent No.: US 6,574,363 B1
(45) Date of Patent: Jun. 3, 2003

(54) METHOD FOR COLOR DETECTION IN VIDEO IMAGES

(75) Inventors: Brian J. Classen, Saskatchewan (CA); Jordan C. Christoff, Santa Barbara, CA (US)

(73) Assignee: Flexi-Coil Ltd., Saskatoon (CA)

( * ) Notice: Subject to any disclaimer, the term of this patent is extended or adjusted under 35 U.S.C. 154(b) by 0 days.

(21) Appl. No.: 09/438,405

(22) Filed: Nov. 12, 1999

Related U.S. Application Data

(60) Provisional application No. 60/108,242, filed on Nov. 13, 1998.

(51) Int. Cl.[7] .................................................. G06K 9/00
(52) U.S. Cl. ........................................ 382/165; 382/110
(58) Field of Search ................................ 382/162–167, 382/110; 358/504–537

(56) References Cited

U.S. PATENT DOCUMENTS

| | | | | |
|---|---|---|---|---|
| 4,167,750 A | * | 9/1979 | Tomimoto et al. | 348/645 |
| 5,028,991 A | * | 7/1991 | Sekizawa et al. | 358/537 |
| 5,555,022 A | * | 9/1996 | Haruki et al. | 348/223.1 |
| 5,621,480 A | * | 4/1997 | Hanai | 348/679 |
| 5,924,239 A | * | 7/1999 | Rees et al. | 47/1.7 |

FOREIGN PATENT DOCUMENTS

| | | |
|---|---|---|
| DE | 41 32 637 | 4/1993 |
| WO | WO96/12401 | 5/1996 |

* cited by examiner

Primary Examiner—Jingge Wu
(74) Attorney, Agent, or Firm—John William Stader; A. Nicholas Trausch; Rebecca L. Henkel

(57) ABSTRACT

A method of identifying pixels of a given color in a field of YUV video manipulates color difference signals (R-Y, B-Y) corresponding to defining axes (U,V) of a color space to maximize the video signal in a region of interest of the space, and minimize the signal in all other regions. Additionally, the color difference signal corresponding to one axis may be rotated toward the other axis, or the entire color space may be rotated to bring the region of interest onto or near one of the axes. The signal gains and rotations may be carried out in the signal processing circuits (52) of a conventional color camera (50) so that only one comparator (90) is needed to detect the target color. After rotation and application of gain, the color difference signal defining the region of interest is compared with a threshold value to determine if a pixel is of the target color. A video camera may be mounted on an agricultural sprayer to detect green weeds on the brown soil, by identifying the green pixels in the image captured while the sprayer travels in the field. A spray material may be released upon the weed, once the weed is detected.

10 Claims, 3 Drawing Sheets

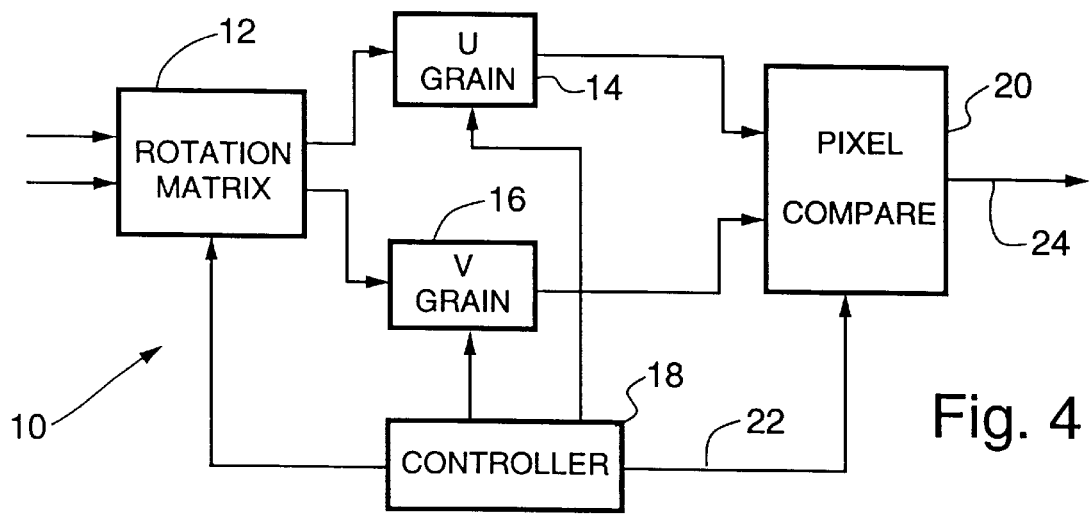
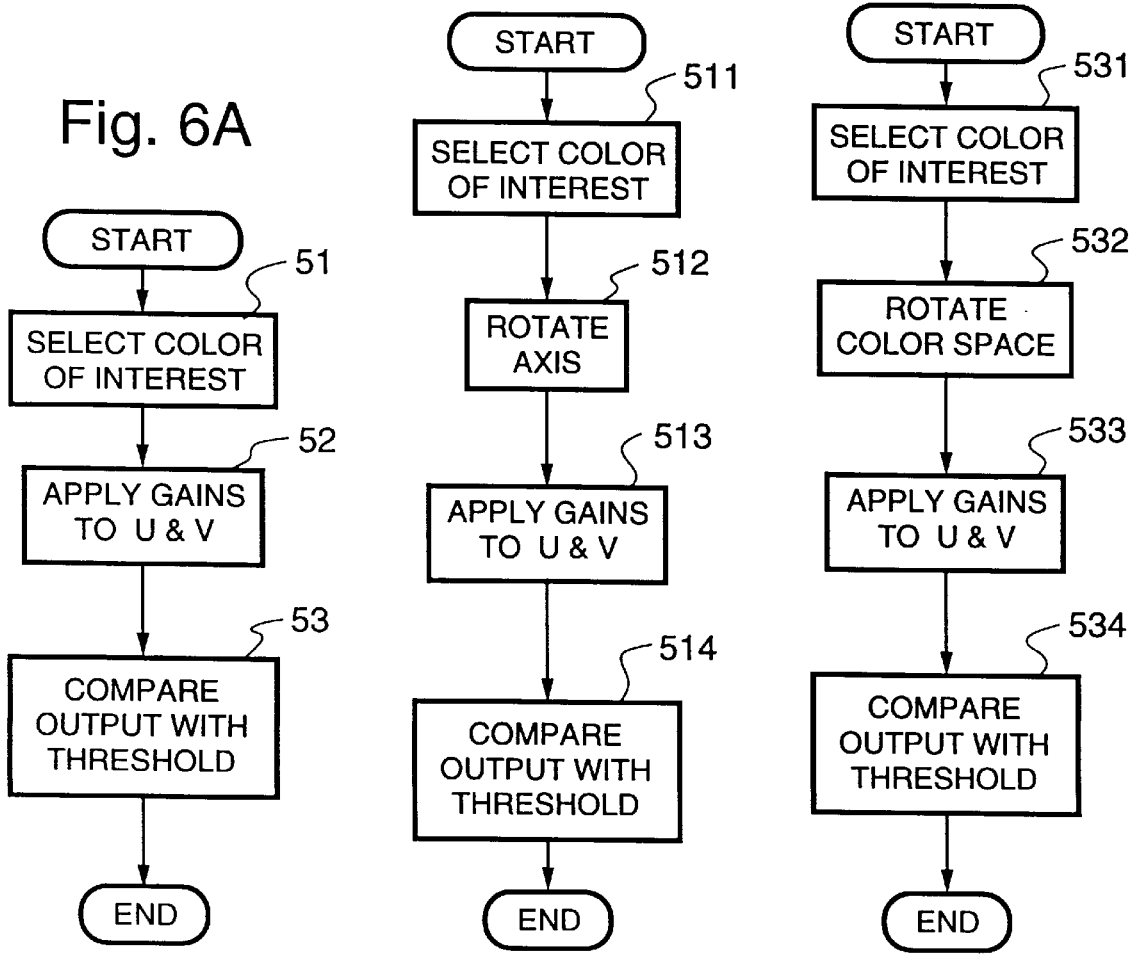

METHOD FOR COLOR DETECTION IN VIDEO IMAGES

RELATED APPLICATIONS

This application is related to our concurrently filed U.S. application Ser. No. entitled Color Enhancement Method and claims benefit of U.S. Provisional Application No. 60/108,242, filed Nov. 13, 1998 the disclosures which are incorporated herein by reference

FIELD OF THE INVENTION

The present invention relates to a method and apparatus for detecting color in video images, and in particular to a method and apparatus for identifying pixels of a given color in a field of YUV video.

BACKGROUND OF THE INVENTION

A variety of discrimination systems, operating in a range of circumstances, use color analysis as a basic tool. An example can be found in agriculture where a green area, such as a weed or other target plant, must be detected in an area of another color, such as brown soil, in order to be sprayed.

PCT/CA95/00595 (Rees) discloses a spray controller comprising a detector that generates red, green and blue color signals across a field of view. The color signals are used to generate an output control signal 'its green' or 'not green' for actuating a spray nozzle on detection of something deemed to be green. Two possible algorithms which determine if something is 'green' rather than 'not green' are described. One requires the level of green to exceed each of the red and blue components in the color signal. The second algorithm requires the green level to exceed the red level and the blue level to be less than a set value.

Other approaches in the prior art for detecting whether a pixel has a target color involve the use of a look-up table that stores a value for every combination of U and V values, where U and V represent the color difference signals produced by a video camera and define the working color space. These approaches require circuitry to support the addressing and read-back of the look-up table as well as a considerable amount of memory to store the table.

The hardware implementation of the above described approaches requires several blocks of logic circuitry, leading to increased cost and complexity of the system.

The bandwidth of the chroma signal in a standard video signal is sufficient only for determining the chrominance accurately over a span of approximately nine pixels horizontally. In other words, the maximum amount of chroma change, from red to green for example, takes approximately nine pixels in a horizontal line. If pixel 1 is red, then the closest pixel which can be green is pixel 10. The pixels between these two will have varying shades from red to green. Similarly, a signal transition from yellow to blue must pass through shades of either red or green along the transition. Thus, a device for detecting green pixels may "detect" green even though only blue and yellow are present in the scene viewed by the camera.

SUMMARY OF THE INVENTION

An object of the present invention to provide a simple and reliable video imaging color detection technique that avoids the problems and disadvantages of the prior art.

According to one aspect of the invention there is provided a method of identifying a pixel of a given color in a field of YUV video by maximizing the pixel's corresponding signal in the color region of interest of a color space, and minimizing signals in all other areas of the color space. Additionally, the color region of interest is rotated so as to be on or near one of the U and V axes of the UV color space.

An advantage of the technique of the present invention is the minimal amount of logic circuitry required for its implementation. Only one comparator is needed in addition to the circuitry already existing within a conventional video camera, the circuitry within the camera performing the axis rotation and signal gain. Another advantage of this technique is that the number of false detections of pixels of a given color due to insufficient chroma bandwidth is greatly reduced.

The invention provides methods of processing a video signal to recognize whether a pixel belongs to a region of interest of a color space. A first method comprises the steps of, for each pixel, transforming the video signal into color difference signals corresponding to a set of defining axes of the color space; minimizing the signal gain for all color difference signals except for a color difference signal defining the region of interest; establishing a threshold value representing the minimum magnitude the color difference signal defining the region of interest must have when the pixel belongs to the region of interest of the color space; and comparing the color difference signal defining the region of interest with the threshold value to determine if the pixel is in the region of interest. In a specific application useful for detecting green weeds to be sprayed in a field, the axes are a red axis and a blue axis and the region of interest is green. In this case the gains of the blue axis signal and positive red axis signal are minimized, leaving the negative red axis signal. The negative red axis signal is then compared to a threshold value to determine if it is negative enough to be considered green.

A modification of the method comprises rotating one axis signal toward the other axis. Green has a negative blue component. To take advantage of this data the blue axis signal is rotated toward the red axis before the gains are applied.

In a further embodiment the entire color space is rotated to bring the color region of interest closer to, or onto, one of the axes.

According to a further aspect of the invention there is provided an apparatus for processing a video signal to determine when a pixel belongs to a region of interest of a color space, the apparatus comprising: a transformation circuit for transforming the video signal into color difference signals corresponding to a set of defining axes of the color space; gain circuits for minimizing the signal gain of all color difference signals except for a color difference signal defining the region of interest; and a comparator responsive to at least one of the gain circuits for comparing the color difference signal defining the region of interest with a threshold value representing the minimum magnitude the color difference signal defining the region of interest must have when the pixel belongs to the region of interest, the comparator producing an output signal indicating the pixel is in the region of interest when the color difference signal defining the region of interest exceeds the threshold value. The apparatus may include a matrix for rotating the color difference signal corresponding to one axis toward the other axis.

An object of the invention is to provide an apparatus as described above in combination with at least one spray nozzle mounted on the boom of a an agricultural sprayer, and means responsive to the comparator output signal for energizing at least one spray nozzle.

An application of the present technique is in agriculture, for weed detection. A video camera mounted on the spray boom of an agricultural sprayer may detect green weeds on brown soil by identifying the green pixels in the image captured as the sprayer travels in the field. With the aid of a controller, spray may be released upon the weed, once the weed is detected.

Other advantages, objects and features of the present invention will be readily apparent to those skilled in the art upon consideration of the following detailed description of preferred embodiments and the accompanying drawings.

BRIEF DESCRIPTION OF THE DRAWINGS

FIG. 4 is a block diagram illustrating the basic functions of an embodiment of the invention wherein the color signals are supplied from a color video camera, the axis rotation and gain control being carried out external to the camera;

DETAILED DESCRIPTION OF THE INVENTION

The method of the present invention is used to identify the color of pixels in a field of video using the color difference signals R-Y and B-Y. The color difference signals assume various names in the art, such as UV, CbCr, Cb'Cr', depending on the video encoding format. These various formats differ mainly in their scale and relative magnitude. More importantly, there are well-known methods for transforming from any system to another, and the exact system with which one works has no direct bearing on the present invention. For simplicity, the color difference signals are referred to as the red (V) signal and the blue (U) signal and the color space will be referred to as the UV color space for its 2-dimensional version at a constant luminance level, and the YUV color space for its 3-dimensional version, where Y represents luminance.

Generally, video cameras perform mathematical transformations on the input data in order to produce a red and a blue color difference signal for each pixel. These calculations are performed to produce red (V) and blue (U) signals in accordance with specified standards for video signals, such as NTSC or PAL. Standard color processing involves applying gain to the U and V signals in order to generate levels of appropriate relative amplitude for the color being observed.

In a first embodiment of the invention, colors that are predominantly along one axis of the UV color space, such as green, yellow, red and blue, are considered. For simplicity, the invention will be described primarily as it applies to the identification of green pixels. However, it will be appreciated by those skilled in the art that the principles of the invention apply to other colors satisfying the above condition.

Figure 1:
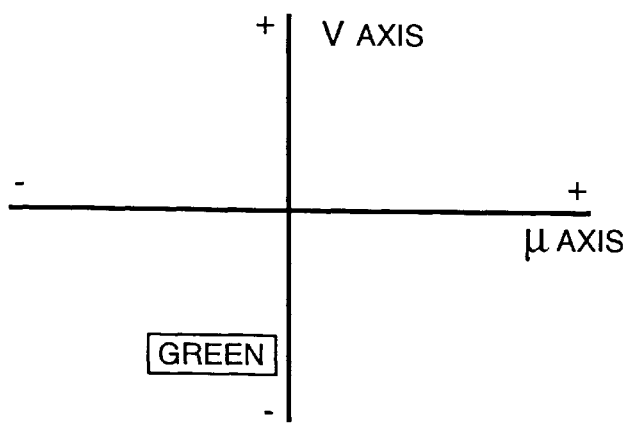
FIG. 1, represents the two-dimensional UV color space.
Figure 2:
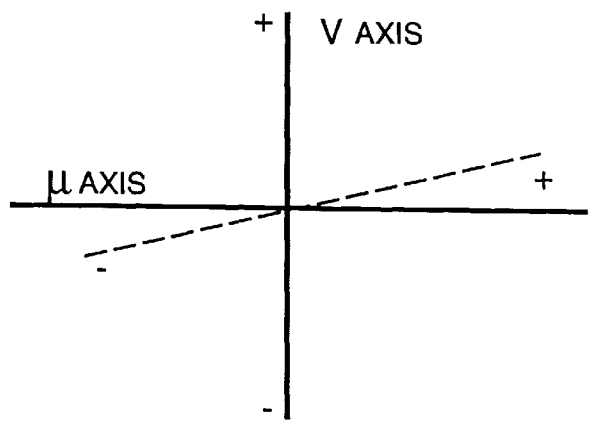
FIG. 2 represents the UV color space of FIG. 1 after the U axis signal has been rotated 13° to bring a blue or yellow region of interest onto, or close to the U axis.
Figure 3:
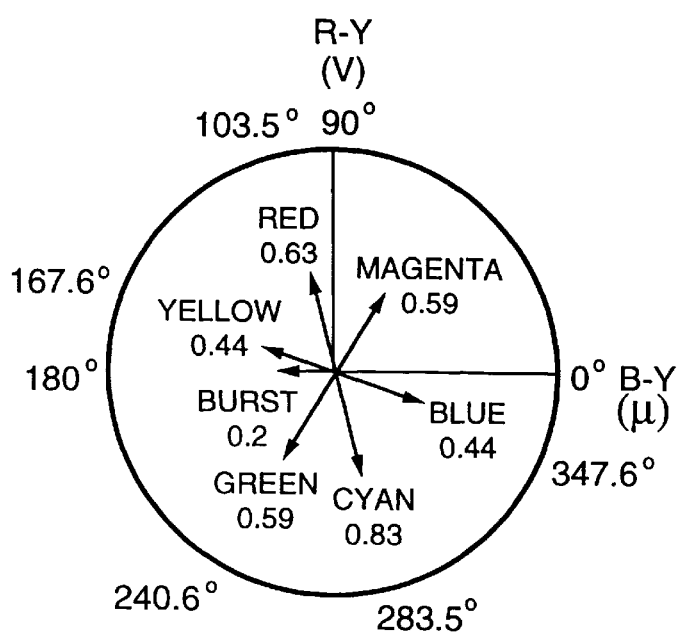
FIG. 3 is a more detailed representation of the two-dimensional UV color space.

FIGS. 1 and 3 represent the two-dimensional color space UV, defined by U and V orthogonal axes, which correspond to the color difference signals B-Y and R-Y from a color video camera. In detecting green pixels, the negative V axis defines the region of interest because, as shown in FIG. 3, the green hue vector lies in the third quadrant and is displaced clockwise from the negative V axis so as to fall in the area identified as "green" in FIG. 1. Standard color processing methods can be modified to take advantage of this fact in identifying green pixels in a field of video. The modification comprises the step of distorting the output signal in favor of the identification of green pixels. The distortion is accomplished by setting to zero the gains for the U signals and positive V signals. After performing these operations, the output signal is substantially a red or V signal which has only negative values and indicates only the negative red content of the scene captured by the video camera.

Based on this output signal, the identification of green pixels merely requires determining whether the red signal is sufficiently negative to be considered green. Hence a comparison of the red signal to a prescribed threshold value is necessary for the final decision of whether the pixel is green or not. Any red values below (more negative than) the prescribed threshold indicate the presence of green. The prescribed threshold value is arbitrarily selected, based on the level of green desired for the specific application in which the method is used.

The term "negative" is used in a relative sense rather than an absolute sense. In a preferred embodiment of the invention, the signals U and V are signed 8-bit numbers in two's complement format. The decimal value 128 defines the axis crossing point in FIG. 1. As used herein a "negative" U axis signal is to the left of the crossing point and a "negative" V axis signal is below the crossing point.

FIG. 6A is a flow diagram illustrating the steps in a method as just described. At S1 (step 1) the color of interest (the target color) is selected. At S2, gain is selectively applied to the signals U and V to minimize or reduce to zero all signals except for those representing the region of interest. That is, if the color selected at S1 is green, then at S2 the signals U and positive values of the signal V are minimized leaving only (or primarily) negative values of the V signals. At S3, the V signal, which now has only negative values, is compared with a threshold to determine if the V signal is sufficiently negative to be considered green.

FIG. 6B illustrates a modification of the method shown in FIG. 6A. This modification takes into account the fact that the target color (green) selected at S11 also contains a small amount of negative blue color, the hue vector for green being displaced from the negative V axis in a clockwise direction by 29.4°. In order to preserve this information and to enhance the reliability and consistency of the green identification, the U axis signal is rotated by 29.4° counter-clockwise at S12. This rotation effectively places the green signal information on or near the negative V axis.

Following the rotation, the green information is in substantially the same region of the color space as the negative V signal, and the points of green are amplified by the negative V signal gain. The gains for U signals and positive V signals are set to zero, and the gain for negative V (green) signals is maximized at S13.

The identification of green pixels can then be done as previously outlined, by comparing the negative V axis signal to a threshold value (S14) to determine if the signal is sufficiently negative to be considered green. In terms of logic circuitry, only one comparator is needed to compare the red signal to a prescribed threshold value. The comparator may be either an analog or a digital comparator.

The rotation of the U axis signal is not limited to 29.4°. The optimum amount of rotation is dependent on the hue of the weeds to be detected. For example, if the weeds are a yellowish green, that is, the weed color has a high yellow component, the detection of yellowish green pixels is enhanced by rotating the U axis signal by more than 29.4°. On the other hand, if the weed color has a high negative red component then a rotation of less than 29.4° will provide maximum extraction of the color information.

It will be understood by those skilled in the art that when the setting to zero of the signals gains is mentioned above, one requires in fact only a modification of the gain, such that a contrast between the region of interest and the rest of the color space is achieved.

Likewise, the prescribed threshold value is negative red for the purpose of green identification, but in general, it may have any value, depending on the target color, the color standards and encoding formats used, the exact modality of implementing the method within the logic circuitry and so on.

FIG. 6C illustrates a further modification of the method shown in FIG. 6A. In this method, after selecting a target color at S31, the entire color space is rotated at S32. The degree or amount of rotation depends on the target color selected. Referring to FIG. 3, it is seen that yellow and blue lie generally about 13° off the U axis. By rotating the entire color space about 12° counterclockwise, both yellow and blue are moved near the U axis. At step S33, gains are selectively applied depending on whether yellow or blue is the selected target color. For example, if yellow pixels are to be detected, S33 minimizes positive and negative V axis signals and positive U axis signals so that the negative U axis signals are left as the dominant signals subjected to threshold comparison at S34.

FIG. 4 is a block diagram of a system 10 that may be utilized to practice the methods, described above, of identifying the color of a pixel. The system 10 utilizes the color difference signals produced by a color video camera (not shown) and comprises a rotation matrix 12 (required only to practice the methods shown in FIGS. 6B and 6C), U and V gain amplifiers 14 and 16, a micro controller 18 and a pixel compare circuit 20.

In practicing the method shown in FIG. 6B, matrix 12 receives the color difference signals U and V produced by the camera and rotates one axis signal (assumed to be the U axis) toward another axis (assumed to be the V axis) in response to commands from controller 18. The resulting V axis signal, which now includes a negative blue component, is applied to V gain amplifier 16 and the signal U is applied to the U gain amplifier 14. The U and V gain amplifiers 14 and 16 are controlled by controller 18 so that the output signal is minimized for all regions in the color space except in the region of interest. Assuming the region of interest is green, the controller 18 controls the U and V gain amplifiers to minimize the U and positive values of V and maximize negative values of V. The resulting gain controlled signals are applied to pixel compare circuit 20 where the signal corresponding to the color region of interest is compared with a reference value supplied by controller 18 over signal path 22. Again assuming the region of interest is green, each negative V output from gain circuit 16 is compared with the reference value and if it is more negative than the reference value, pixel compare circuit 20 produces a signal on lead 24 indicating the pixel is green. The circuit 20 may be an analog device but a digital comparator is preferred.

The method illustrated in FIG. 6C may be implemented by system 10 if the controller is programmed to apply commands to matrix 12 so as to rotate the entire color space. The method illustrated in FIG. 6A may be implemented by the system 10 if the controller is programmed to control matrix 12 so that no rotation is performed. Preferably however, matrix 12 is eliminated in this case and the color difference signals from the video camera are applied directly to the U and V gain circuits 14 and 16.

It will be recognized that the system 10, as depicted in FIG. 4, is capable of recognizing a pixel of any target color. In applications where the target color will not change, one of the gain circuits may be eliminated. For example, in recognizing green weeds, the U axis gain circuit 14 is not required.

In FIG. 4, the axis rotation matrix 12 receives the color signal output of a video camera. However, conventional color video cameras typically include an axis rotation matrix for color signal processing, as well as a micro controller and gain circuits. Therefore, the invention may, and preferably is, implemented by directly connecting the pixel compare circuit 20 to receive the color output signals from the camera. This arrangement is illustrated in FIG. 5.

Figure 5:
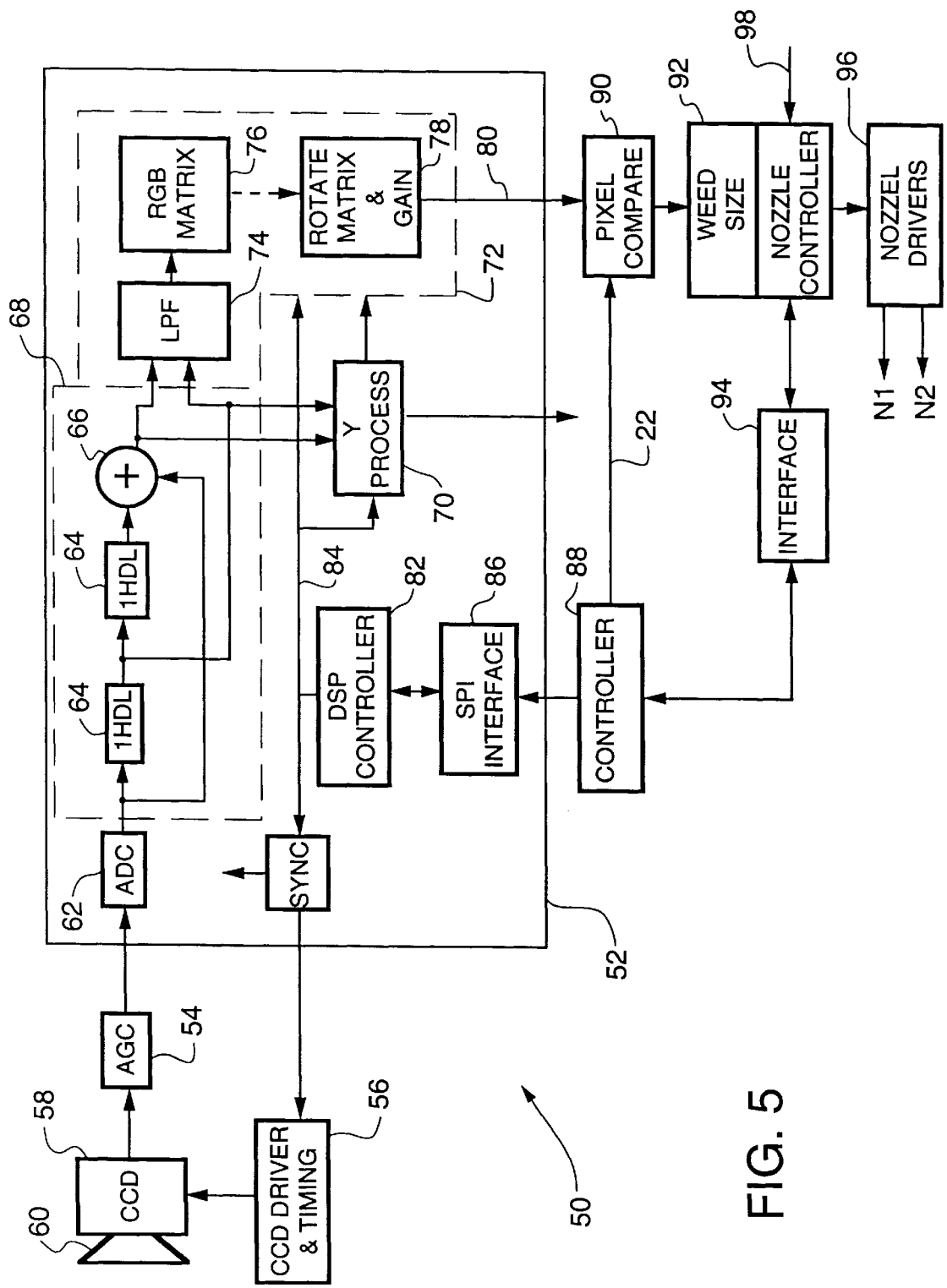
FIG. 5 is a block diagram illustrating a second embodiment of the invention wherein axis rotation and gain control are carried out by circuits within a color video camera; and, FIGS. 6A–6C are flow diagrams illustrating methods of detecting pixel color according to the invention.

The system 50 shown in FIG. 5 may be implemented using a camera comprising a Sony SS-1 3-chip set including a model CXD2163R digital signal processor (DSP) chip 52, a model CXA2006Q analog gain control (AGC) chip 54, and a model CXD2480R CCD Driver and Timing Control chip 56. These three chips form a complete video camera for digitally processing analog signals produced by a CCD sensor 58. Sensor 58 is mounted on the boom (not shown) of an agricultural sprayer and is provided with a lens 60 so that an image of a field in front of the sprayer is imaged onto the sensor. The CCD Driver and Timing circuits 56 control the "shutter speed" and readout of the analog color video signal from the sensor to AGC 54.

The analog video output signal from AGC 54 is applied to DSP 52 where it is first converted to a digital video signal by ADC 62. The output of ADC 62 is then applied to a contour correction circuit 68 comprising two delay circuits 64 and a summer 66. The contour correction circuit is described in U.S. Pat. No. 5,343,244 and produces output signals that are applied to a luminance signal processing circuit 70 and a chrominance signal processing circuit 72.

Within the chrominance signal processing circuit 72, the contour corrected signal is first applied to a low pass filter (LPF) 74 and the output of filter 74 is applied to a matrix 76 that develops the chroma signals R, G and B. The RGB signals, after white balancing and gamma correction by circuits not shown, are applied to a rotation and gain matrix 78. Matrix 78 normally transforms the RGB signals into the color difference signals U (B-Y) V (R-Y), alternately producing 8-bit signals U and V at its output 80. In accordance with the present invention, matrix 78 is also controlled to rotate the B-Y or U axis signals toward the R-Y or V axis as previously described, and minimize the U axis signals and the positive V axis signals.

The DSP chip 52 includes a DSP micro controller 82 for controlling, via a serial data bus 84, various circuits within the DSP, including the rotation and gain imparted to the color difference signals by matrix 78. The DSP chip also includes an interface circuit 86. In accordance with the invention, a system controller 88 is connected to the DSP controller 82 via interface circuit 86. Controller 88 is connected via a serial interface circuit 94, a nozzle controller 92 and a CAN bus 98 to an input device (not shown) so that an operator may select the target color and set the color threshold level, that is, for example, how negative the V signal on path 80 must be in order to be classified as green by a pixel compare circuit 90. The target color and is utilized in controller 88 to develop the gain and rotation signals. These signals are relayed to controller 82 which utilizes the signals to set the gains and rotation imparted to the pixel signals by matrix 78.

The target color is also utilized by controller 88 to develop the color threshold signal that is applied to pixel compare circuit 90. The color threshold level provided by controller 88 may be a color corrected threshold which takes into account the luminance in a field of video. The color corrected threshold, developed from pixel luminance in one field of video as described in our above-referenced concurrently filed application, is transferred to pixel compare circuit 90 prior to the next field. Compare circuit 90 then compares the color corrected threshold with the UN signals from matrix 78.

Compare circuit 90 does not utilize the U signal when the target color is green. The circuit compares the color corrected threshold level signal with the values of V produced by matrix 78, and if V is more negative than the corrected threshold level then an output signal is made available to nozzle controller 92 indicating the pixel is the target color, i.e. green.

Pixel compare circuit 90 is a programmable logic array. In addition to comparing for a target color, the circuit also counts the number of pixels of the target color occurring on each video scan line. Controller 92 samples the outputs from circuit 90 and also receives, via a CAN bus 98, the on and off times for the nozzles and a weed size value input by an operator. In this regard, a sprayer, which may spray a material over a path having a width of up to 30 feet or more, is provided with a plurality of cameras. Each camera is aimed so as to view a different portion of the path to be sprayed. The field of view of each camera is divided into two regions and two nozzles N1, N2 are provided for spraying a respective region, the nozzles being close to, but trailing the camera. Controller 92 utilizes the green/not green signal from compare circuit 90 to determine, for each scan line, how many green pixels have been detected within each region. If the number of green pixels within a region exceeds the weed size value supplied via CAN bus 98, then one of nozzle drivers 96 is actuated to activate the nozzle for that region.

Since the nozzles trail the camera, a nozzle is not turned on immediately upon detection of a weed. A sensor and a conventional circuit (not shown) determine the time at which a nozzle is turned on, based on the travel of the sprayer and the camera to nozzle distance.

The system 50 may be used to implement any of the methods illustrated in FIGS. 6A–6C to recognize any color by proper programming of the DSP controller 82 to set the proper rotation and gains in matrix 78.

From the foregoing description it is evident that the present invention provides a simple but reliable method of identifying pixels of a target color within a field of video. In terms of logic circuitry, the technique requires only one comparator, in addition to the circuitry required for standard processing of video images. The various rotations that are to be performed before the final comparison can be achieved by manipulating the gains in a video camera color transformation matrix.

Furthermore, the invention reduces the number of false detections due to insufficient chroma bandwidth, as discussed in the Background section, by minimizing the color gain in all but the region of interest, and compressing all other regions along one of the U or V axes. Since regions which are not of interest are compressed along one of the U or axes and receive no signal gain, the transitions from one color to another which transition across the target color are reduced.

Numerous modifications, variations and adaptations may be made to the particular embodiments of the invention described above without departing from the scope of the invention as defined in the appended claims.

We claim:

1. A method of processing a video signal to determine when a pixel belongs to a region of interest of a color space, the method comprising the steps of, for each pixel:
    a) transforming the video signal into color difference signals corresponding to a set of defining axes of the color space;
    b) minimizing signal gain for all color difference signals except for a color difference signal defining the region of interest;
    c) establishing a threshold value representing the minimum magnitude that the color difference signal defining the region of interest must have when the pixel belongs to the region of interest of the color space; and,
    d) comparing the color difference signal defining the region of interest with the threshold value to determine if the pixel is in the region of interest of the color space, wherein said region of interest is green, said defining axes are a V axis and a U axis, wherein the V axis is defined as the red axis and the U axis is defined as the blue axis, and the color difference signal defining the region of interest is a negative V axis signal, and wherein the step of minimizing signal gain comprises minimizing the U axis signal and positive V axis signal.

2. A method as claimed in claim 1, further comprising the step of modifying said color difference signals to rotate said color space.

3. A method as claimed in claim 1, further comprising the step of rotating the color difference signal corresponding to one of said axes toward the other of said axes.

4. An apparatus for processing a video signal to determine when a pixel belongs to a region of interest of a color space, the apparatus comprising:
    a) a transformation circuit connected to receive a video signal, wherein the transformation circuit transforms the video signal into color difference signals corresponding to a set of defining axes of the color space;
    b) gain circuits connected to receive color difference signals from the transformation circuit, wherein the gain circuits minimize the signal gain of all color difference signals except for a color difference signal defining the region of interest; and,
    c) a comparator connected to be responsive to one of the gain circuits, wherein the comparator compares the color difference signal defining the region of interest with a threshold value, the threshold value representing the minimum magnitude that the color difference signal defining the region of interest must have when the pixel belongs to the region of interest of the color space, wherein the comparator produces an output signal indicating that the pixel is in the region of interest of the color space when the color difference signal defining the region of interest exceeds the threshold value.

5. An apparatus as claimed in claim 4, wherein said axes comprise a V axis and a U axis, said color difference signals comprise a V axis signal and a U axis signal, and said apparatus further comprises a matrix for rotating the U axis toward said V axis.

6. An apparatus as claimed in claim 5, wherein said gain circuits comprise means for minimizing the U axis signal and positive V axis signals, said comparator being responsive to negative V axis signals for indicating that a pixel is green when a negative V axis signal exceeds said threshold value.

7. An apparatus as claimed in claim 6, wherein said transformation circuit, said gain circuits and said matrix form a color video camera.

8. An apparatus as claimed in claim 7, wherein said camera is mounted on a spray boom of an agricultural sprayer.

9. An apparatus as claimed in claim 7, in combination with at least one spray nozzle and means responsive to said comparator output signal for energizing said at least one spray nozzle.

10. An apparatus as claimed in claim 6, in combination with means responsive to said comparator for determining when a weed of a least a predetermined size has been detected, and at lease one nozzle actuates by said means responsive to said comparator.

* * * * *